United States Patent [19]
Masters

[11] Patent Number: 6,152,877
[45] Date of Patent: Nov. 28, 2000

[54] MULTIMODE VIDEO CONTROLLER FOR ULTRASOUND AND X-RAY VIDEO EXCHANGE SYSTEM

[75] Inventor: Donald Masters, Sunnyvale, Calif.

[73] Assignee: SciMed Life Systems, Inc., Maple Grove, Minn.

[21] Appl. No.: 09/212,876

[22] Filed: Dec. 16, 1998

[51] Int. Cl.$^7$ ..................................................... A61B 8/00
[52] U.S. Cl. ........................ 600/437; 600/407; 348/441
[58] Field of Search ................................. 348/441, 571; 600/407, 410, 437, 425

[56] References Cited

U.S. PATENT DOCUMENTS

| | | | |
|---|---|---|---|
| 5,348,938 | 9/1994 | Nishiki et al. . | |
| 5,398,684 | 3/1995 | Hardy | 600/410 |
| 5,528,301 | 6/1996 | Hau et al. | 348/441 |
| 5,542,416 | 8/1996 | Hilton et al. | 395/161 |
| 5,724,101 | 3/1998 | Hashin | 348/441 |
| 5,943,050 | 8/1999 | Bullock et al. | 345/340 |
| 5,954,650 | 9/1999 | Saito et al. | 600/425 |
| 5,970,499 | 10/1999 | Smith et al. | 707/104 |
| 5,993,001 | 11/1999 | Bursell et al. | 351/212 |
| 6,057,889 | 5/2000 | Reitmeier et al. | 348/555 |

OTHER PUBLICATIONS

Patent Abstracts of Japan, Publication No. 01210862, Composite Display Method for Ultrasonic Video and other Video, Hitachi Constr. Mach Co Ltd; Aug. 24, 1989.

Patent Abstracts of Japan, Publication No. 10328145, Electron Endoscope System Device, Fuji Photo Optical Co Ltd; Dec. 15, 1998.

*Primary Examiner*—Francis J. Jaworski
*Attorney, Agent, or Firm*—Lyon & Lyon LLP

[57] ABSTRACT

Systems and methods for exchanging ultrasound and X-ray video signals are disclosed. The system may select an analog X-ray input signal from, for example, either a fluoroscopic or roadmap video signal according to user input. The analog X-ray input signal is digitized and converted using the appropriate video conversion factors to a standard high-resolution format suitable for display on, for example, an intravascular ultrasound monitor. The digitized X-ray signal is electrically isolated from the graphics cards operating the intravascular ultrasound display. The system also digitizes high-resolution ultrasound video and converts it to a format suitable for display on a hospital X-ray monitor. The converted and digitized ultrasound video is electrically isolated from the hospital X-ray monitors.

12 Claims, 5 Drawing Sheets

VIDEO SWITCH

VIDEO CONVERSION FUNCTION (VIF) SUBSYSTEM

MULTIMODE VIDEO CONTROLLER FOR ULTRASOUND AND X-RAY VIDEO EXCHANGE SYSTEM

INTRODUCTION

This invention relates to systems for exchanging ultrasound and X-ray video signals. More particularly it relates to a system for exchange and/or simultaneous depiction of fluoroscopic images, catheter lab roadmap images, and ultrasound images according to various video standards employed in catheterization labs.

BACKGROUND OF THE INVENTION

Procedures such as balloon angioplasty and numerous other medical procedures such as atherectomy and laser angioplasty occur in catheterization labs (cath labs). In such labs, a physician will direct a catheter through vessels remote from a patient's heart using real-time fluoroscopic and static X-ray images. The static X-ray image is conventionally referred to as the "roadmap" because it is an image of the coronary arteries stained with radio-opaque dies. The physician uses this image in maneuvering the catheter towards the desired coronary artery, hence its name of "roadmap." As the physician remotely guides the catheter towards coronary arteries, he or she can compare the progress of the catheter as shown on the fluoroscopic image with the location of the coronary arteries as revealed on the roadmap image.

In addition to the fluoroscopic and roadmap images, the physician may also view intravascular ultrasound images gathered from a rotating transducer associated with the catheter. Using ultrasound, the physician may directly image plaque affecting coronary arteries before treatment with, for example, balloon angioplasty. In ordinary operation, the fluoroscopic, roadmap and ultrasound images are viewed on their respective monitors. Each image can have a different brightness, color, etc. The differences in the images may strain a physician's eyes when comparing images on differing monitors. The differences in image quality from monitor to monitor may also increase the difficulty of pinpointing regions of interest because the human eye is likely to focus on the noticeable difference in image quality rather than clinically important image details. Often, therefore, a physician will want the roadmap or the fluoroscopic images to be imported and displayed in a window on the ultrasound monitor or vice versa. The importation of video signals from cath lab fluoroscopic or X-ray monitors onto an ultrasound monitor is complicated by the widely divergent video standards employed by the various manufacturers of such equipment. Moreover, fluoroscopic and X-ray monitors may often have grounds which may float at voltages considerably above the true ground. Such voltages represent a danger to patients in contact with an ultrasound system which is displaying imported video signals from monitors with such floating grounds. Thus, isolation from such potential danger is required in an ultrasound system capable of displaying imported X-ray video signals.

Prior art systems which allowed the importation of X-ray video signals for display on an intravascular ultrasound monitor were cumbersome. Such systems required hardware adapted for the video signals generated by the equipment in a particular cath lab. Should the system be moved to a cath lab using different X-ray equipment, a corresponding change in the hardware was required to accommodate the changed video signals. Consider the following table which illustrates the many different video standards for a number of major manufacturers of cath lab imaging monitors.

TABLE 1

X-Ray Image Standards Table
For reference only

| Standard | RS-170 525/60 | PAL 625/50 | Siemens 1023/60 | Seimens 1249/50 | GE 1023/60 | GE 1249/50 | Phillips 1049/60 | Shimadu 1125/60 | 1023/120 |
|---|---|---|---|---|---|---|---|---|---|
| H Drive | 6.4 µs | 6.4 µs | 2.5 µs | 2.5 µs | 4.58 µs | 4.5 µs | 3.17 µs | 2.96 µs | |
| H Front porch | 1.6 µs | 1.6 µs | 0.8 µs | 0.8 µs | | | 0.79 µs | 0.21 µs | |
| H Blank | 11 µs | 11.2 µs | 7.1 µs | 6 µs | 7.12 µs | 7.01 µs | 5.55 µs | 7.58 µs | |
| H Sync | 4.8 µs | 4.8 µs | 2.5 µs | 2.5 µs | 3.05 µs | 3 µs | 2.38 µs | 2.07 µs | |
| H Freq | 15750 Hz | 15625 Hz | 30.69 KHz | 31.22 KHz | 30.69 KHz | 31.22 KHz | 31.47 KHz | 33.74 KHz | 63 KHz |
| H Key | | | 1.2 µs | 1.2 µs | | | | | |
| H Line Duration | 63.5 µs | 64 µs | 32.58 µs | 32.03 µs | 32.58 µs | 32.03 µs | 31.77 µs | 29.63 µs | |
| V Freq | 60 Hz | 50 Hz | 60 Hz | 50 Hz | 60 Hz | 50 Hz | 60 Hz | 60 Hz | 120 Hz |
| V Drive | 10.5 H | 12.5 H | 20 H | 20 H | 20.5 H | 20.5 H | 20.5 H | 22.5 H | |
| V Front Porch | 3 H | 2.5 H | 3 H | 3 H | 3 H | 3 H | 3 H | 5.5 H | |
| V Sync | 3 H | 2.5 H | 3 H | 3 H | 3 H | 3 H | 3 H | 5 H | |
| Equalizer | 2.35 µs | 2.4 µs | 1 µs | 1 µs | 1.53 µs | 1.5 µs | 1.2 µs | 1.12 µs | |
| Equalizer Pulses | 6 | 5 | 6 | 6 | 6 | 6 | 6 | 11 | |
| Serration Pulse | 4.5 µs | 4.8 µs | 1.8 µs | 1.8 µs | 2.03 µs | 2 µs | 2.38 | 2.07 | |
| Serration Pulses | 6 | 5 | 6 | 6 | 6 | 6 | 6 | 10 | |
| Field Duration | 16.7 ms | 20 ms | 16.7 ms | 20 ms | 16.7 ms | 20 ms | 16.7 ms | 16.7 ms | |
| Aspect Ratio | 4:3 | 4:3 | 1:1 | 1:1 | 1.1:1 | 1.1:1 | 1:1 | 5:4 | |

Given the plethora of video standards encountered in any given catheterization lab, there is a need in the art for a system which can accommodate such a wide variety of video standards. Such a system lowers health care costs because specialized video conversion systems need not be developed. Instead, the use of the present invention allows a single system to be universally used, regardless of the X-ray video equipment in a particular cath lab.

SUMMARY OF THE INVENTION

In one innovative aspect, the present invention provides a system for selecting an analog X-ray input signal from either a fluoroscopic or roadmap video signal according to user input. The analog X-ray input signal is digitized and converted using the appropriate video conversion factors to a standard high-resolution format suitable for display on an intravascular ultrasound monitor. The digitized X-ray signal is electrically isolated from the graphics cards operating the intravascular ultrasound display.

The present invention also digitizes the high-resolution ultrasound video and converts it to a format suitable for display on a hospital X-ray monitor. The converted and digitized ultrasound video is electrically isolated from the hospital X-ray monitors.

In a preferred embodiment, the system stores a plurality of subsets of video conversion factors. Upon entry of a room identification number or other suitable indicia identifying a particular catheterization laboratory, the system selects a video conversion factor subset appropriate for the particular catheterization laboratory. By applying the selected video conversion factors, the system will automatically adjust, for example, video gain settings, roadmap or fluoroscopic monitor vertical and horizontal settings, gamma corrections, DC settings, and related factors.

DETAILED DESCRIPTION OF THE INVENTION

Figure 1:
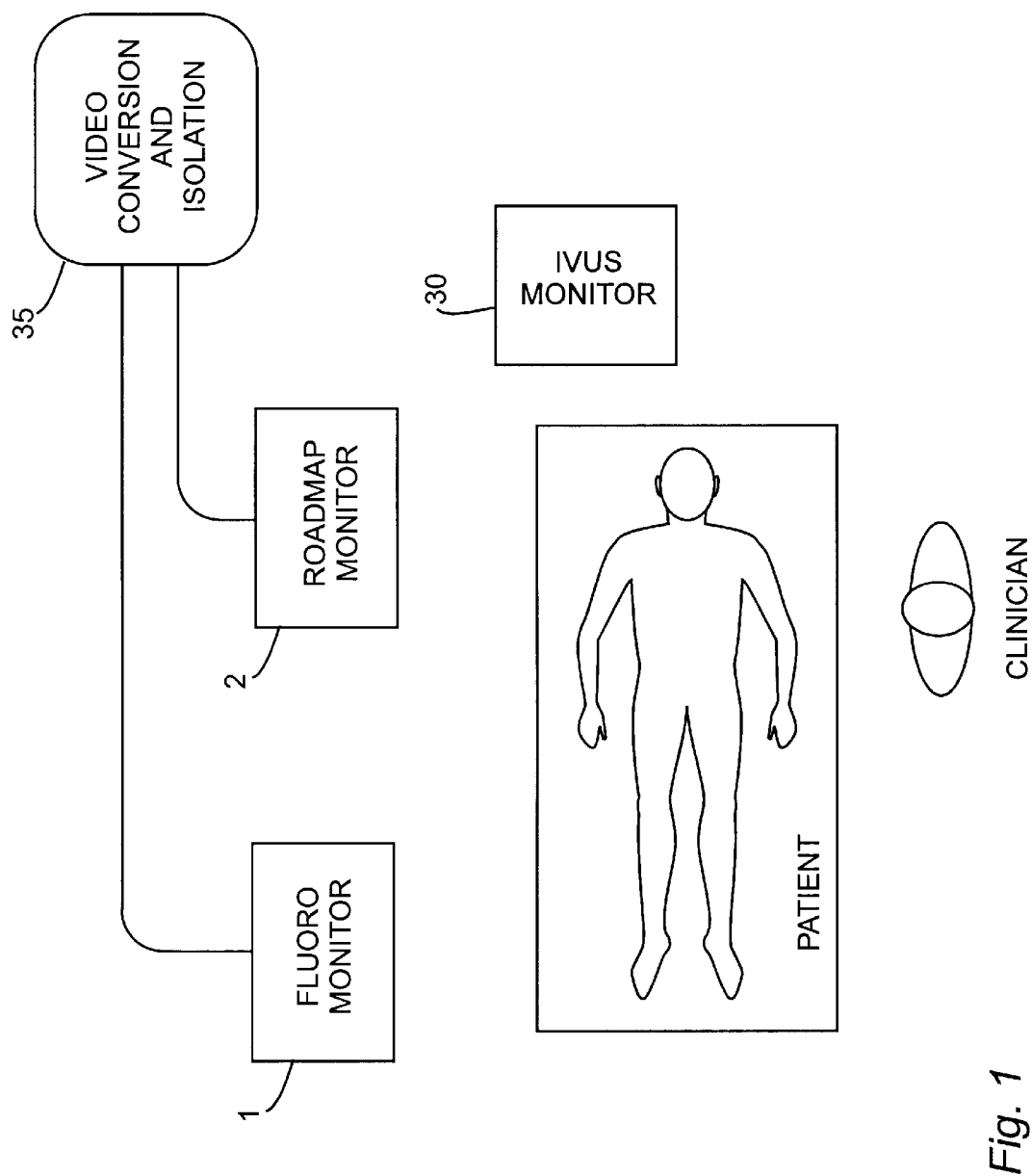
FIG. 1 illustrates a block diagram of a typical catheterization laboratory setup.

Turning now to the figures, a typical catheterization laboratory setup is illustrated in FIG. 1. A clinician guides a catheter through a patient's femoral artery to diseased coronary arteries. The clinician 6 will observe the position of the catheter on the fluoroscopic monitor 1. In addition, the clinician 6 compares the progress of the catheter on the fluoroscopic monitor 1 to the location of the coronary arteries as revealed on the roadmap monitor 2. Through this comparison, the clinician guides the catheter to an occlusion within the coronary arteries. The clinician then guides an intravascular ultrasound (IVUS) transducer along the catheter, preferably to a point just past the arterial occlusion or region-of-interest (ROI) whereupon the ROI is imaged on an IVUS monitor 30 by a controlled drawback of the rotating ultrasound transducer. In a typical catheterization laboratory, the fluoroscopic and roadmap monitors 1 and 2 are considerably larger than the IVUS monitor 30 and are more centrally located with respect to the clinician. Thus, the clinician will often prefer to have the IVUS image displayed on, for example, the roadmap monitor 2 in addition to the IVUS monitor 30. Concurrently, because an IVUS monitor 30 may offer a number of features such as simultaneous cross section and longitudinal IVUS images, the clinician will also want to import X-ray images (roadmap or fluoroscopic video images) to the IVUS monitor 30. The present invention includes a video conversion and isolation system 35 that allows a clinician to advantageously display roadmap or fluoroscopic video images on the IVUS monitor 30 or IVUS images on, for example, the roadmap monitor 2.

The present invention preferably includes a processor associated with a memory so that video conversion and isolation system 35 will store and recall the various video conversion factors. In one embodiment, the entry of a room identification number permits video conversion and isolation system to recall stored video conversion factors corresponding to a particular catheterization laboratory. Such video conversion factors include, for example, video scan rates, video gain settings, roadmap monitor 2 or fluoroscopic monitor 1 vertical height settings, gamma corrections, DC settings, roadmap monitor 2 or fluoroscopic monitor 1 horizontal width settings, and related factors.

Figure 2:
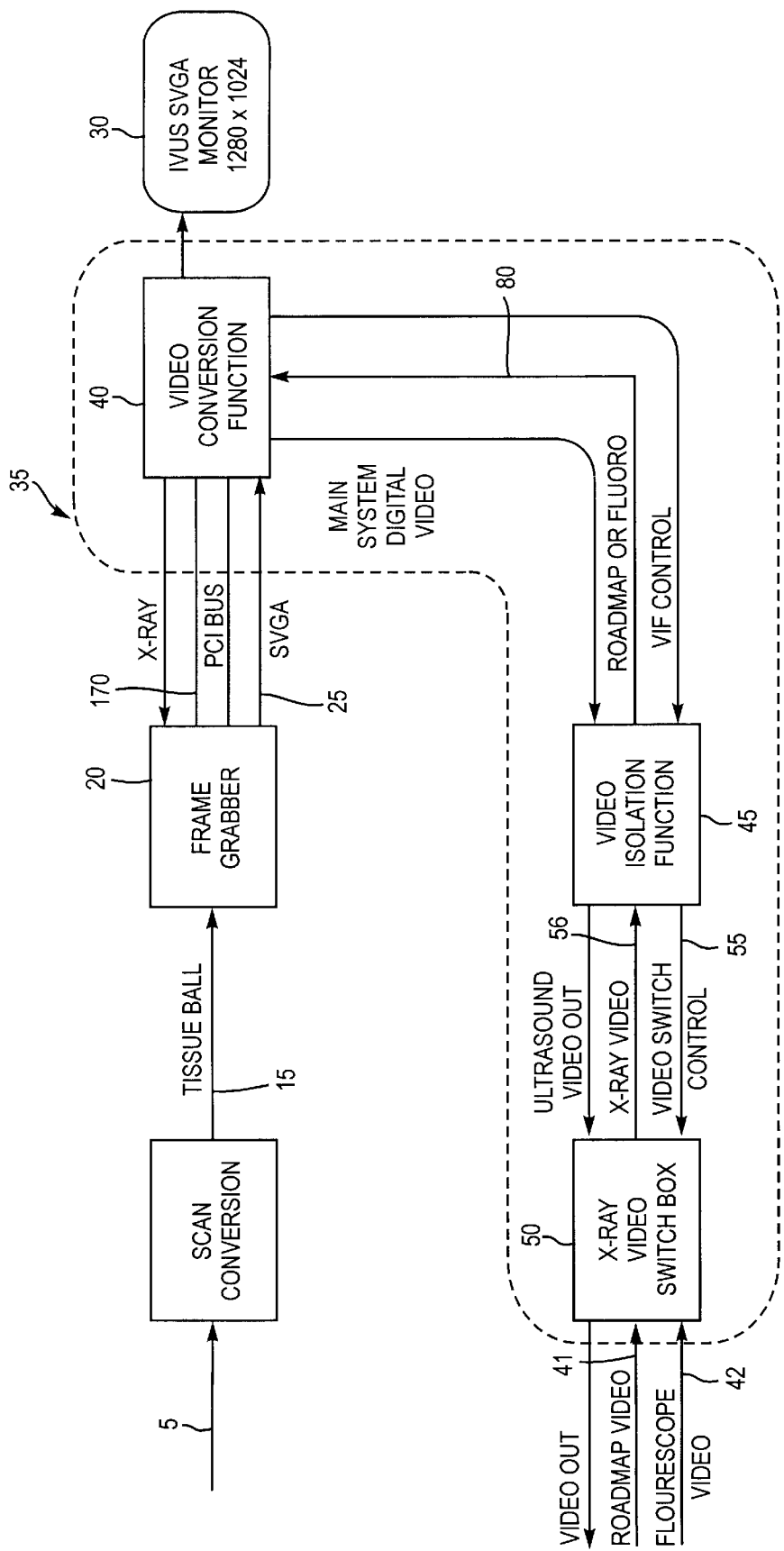
FIG. 2 illustrates a block diagram of the video conversion system according to one embodiment of the invention.

Turning now to FIG. 2, a block diagram of the present invention according to one embodiment is illustrated. An ultrasound transducer (not illustrated) collects R, θ signals 5 from a ROI. The R, θ signals 5 then enter a scan conversion unit 10. Scan conversion unit 10 transforms the R, θ signals into "tissue ball" pixel values 15 appropriate for a CRT display. Preferably scan conversion unit 10 is as disclosed in co-pending application entitled "Ultrasound Imaging with Zoom Having Independent Processing Channels," filed Sep. 28, 1998, Ser. No. 09/162,057, which application is incorporated by reference as if set forth in its entirety herein. Scan converted pixel values 15 enter the graphics card and frame grabber unit 20. Graphics card and frame grabber unit outputs an intravascular ultrasonic image video signal 25, preferably in SXVGA format.

SXVGA intravascular ultrasonic image video signal 25 may displayed on an IVUS monitor 30. The video signal 25 is very high-resolution video, displaying 1280(X) by 1024 (Y) pixels at a relatively high rate of 72 Hz, non-interlaced. As can be seen from Table 1, typical catheterization laboratory X-ray video standards may range from 50 or 60, to even 120 Hz interlaced frame rates. As such, a video conversion must be performed before an X-ray video image may be displayed on the SXVGA monitor. Likewise, the ultrasonic image SXVGA video signal 25 must be converted before it can be displayed on cath lab X-ray monitors.

System 35 performs these conversions. In a preferred embodiment, system 35 comprises three major subsystems: a video conversion function subsystem 40, a video isolation function subsystem 45, and a video switch box 50. This functional partitioning may be physical also with each subsystem residing on a separate circuit board, although this is not mandatory. System 35 may convert ultrasound high-resolution color video to the B/W format required by cath lab X-ray monitors. In addition, system 35 may digitally capture a cath lab X-ray video signal and output this digital video signal to the systems graphics board. Finally system 35 will provide electrical isolation between all external X-ray video input and output and the ultrasound system internal circuitry.

Figure 3:
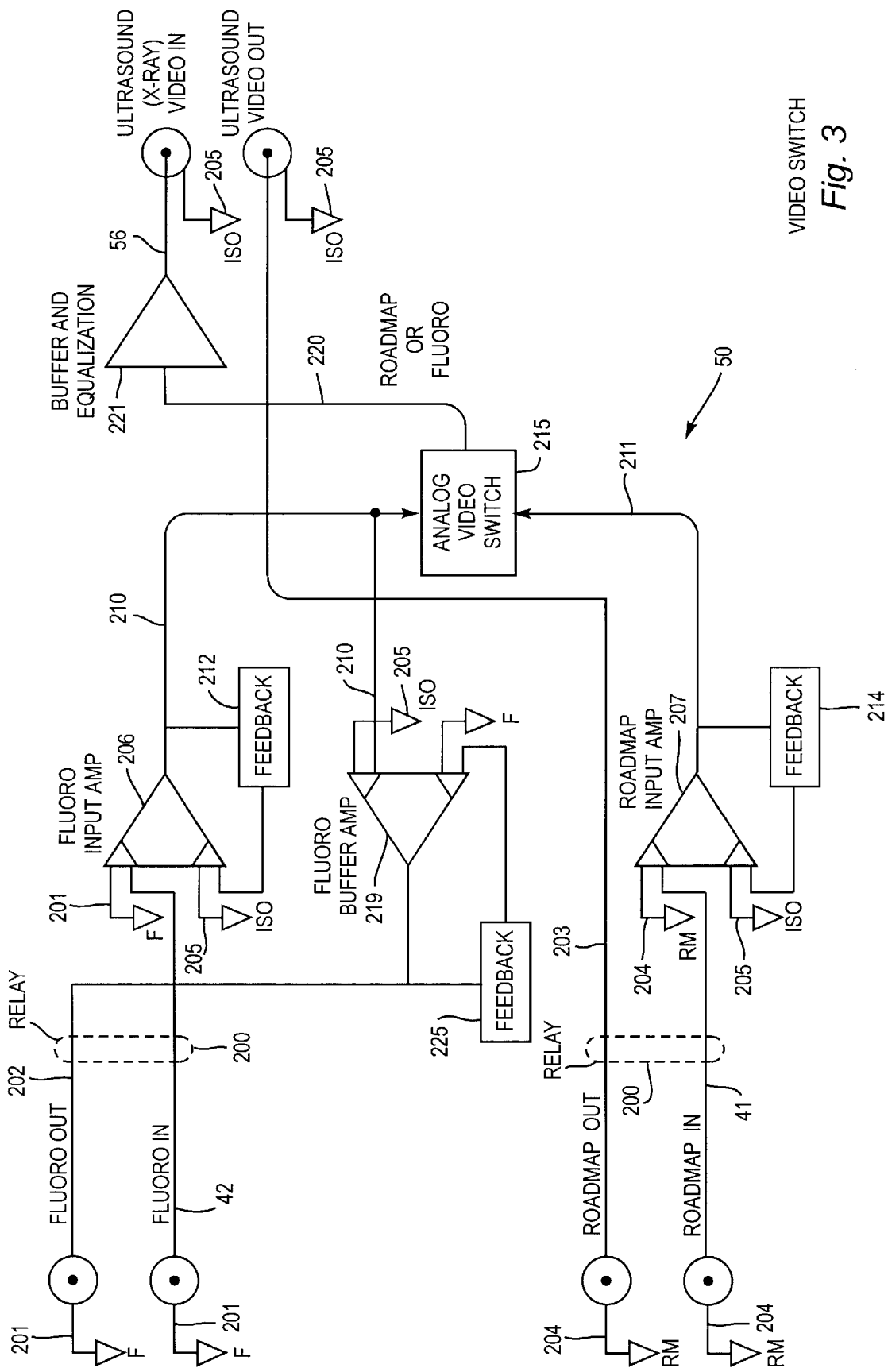
FIG. 3 illustrates a block diagram of the video switch box according to one embodiment of the invention.
Figure 4:
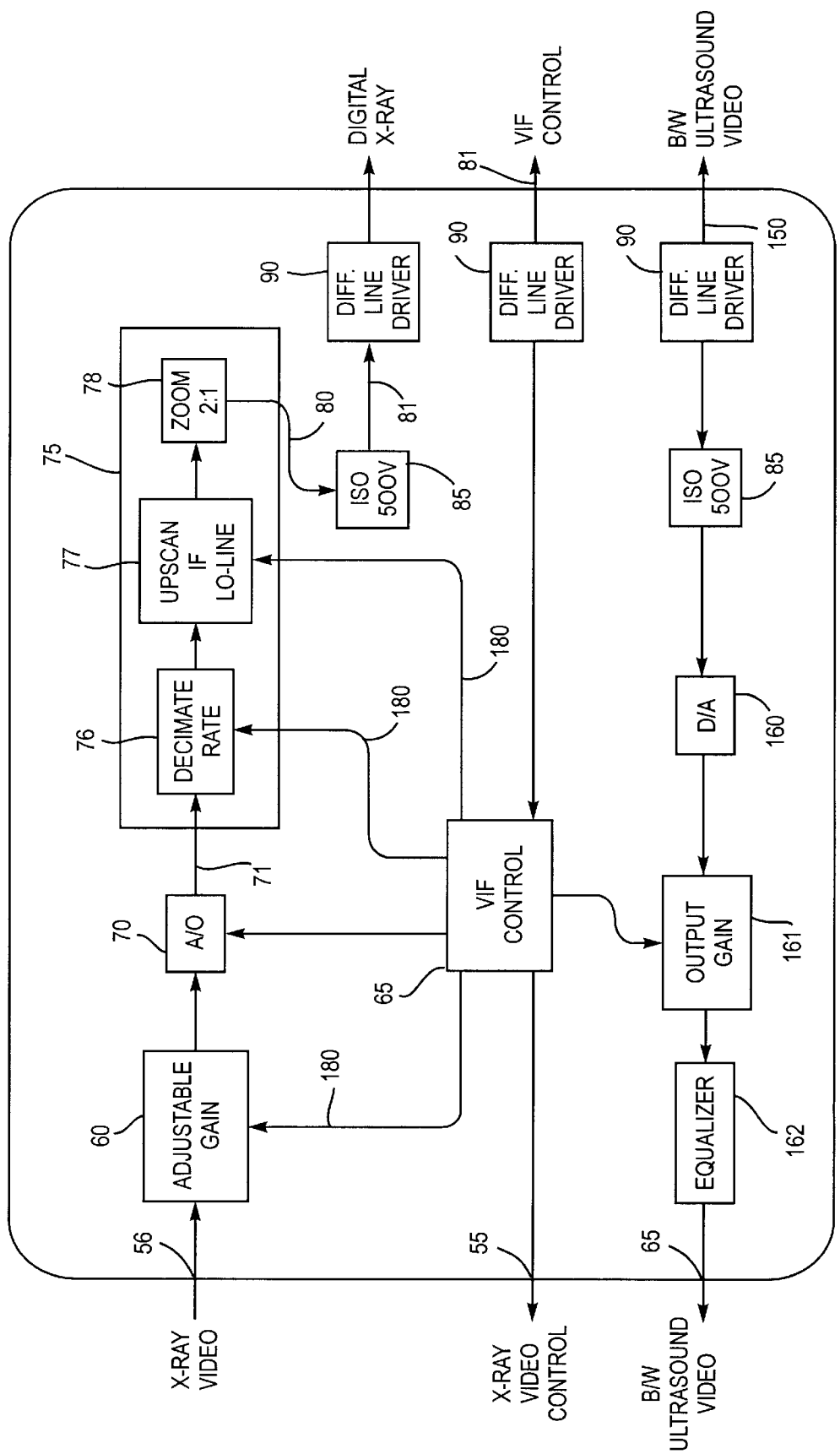
FIG. 4 illustrates a block diagram of the video isolation function subsystem according to one embodiment of the invention.
Figure 5:
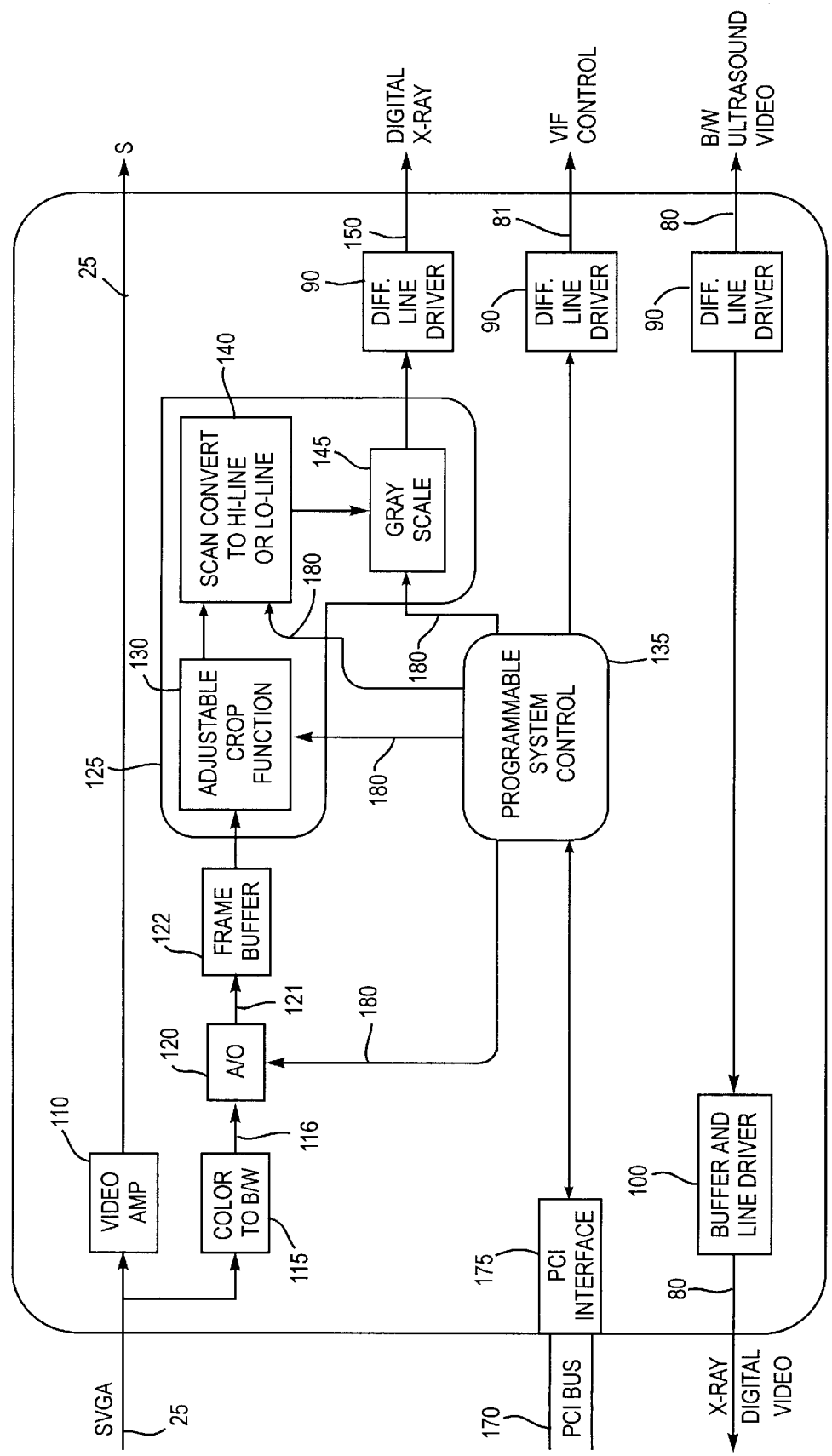
FIG. 5 illustrates a block diagram of the video conversion function subsystem according to one embodiment of the invention.

System 35 accepts an input roadmap video signal 41 and an input fluoroscopic video signal 42. These signals may enter an X-ray video switch box unit 50. Turning now to FIG. 3, a block diagram of the video switch box 50 is illustrated. Both the input fluoroscopic video 42 and the input roadmap video 41 signals may be coupled to relays 200. The relays 200 operate such that if the system 35 is in an "off" state, the relays simply couple the input signals 41 and 42 to the output roadmap video signal 203 and the output fluoroscopic video signal 202, respectively. Corresponding to input and output fluoroscopic video signals 42 and 202 is the fluoroscopic video ground 201. Similarly, corresponding to the input and output roadmap video signals 41 and 203 is the roadmap video ground 204. The grounds of catheterization laboratory X-ray video signals may float several volts off a true ground. Thus, both the fluoroscopic video ground 201 and the roadmap video ground 204 may float independently off the true ground. Therefore, before either the input fluoroscopic or roadmap video 42 and 41 may be transferred to the IVUS monitor 30, the signals must be converted to the IVUS ground 205. Such conversion occurs in fluoroscopic and roadmap differential video input amplifiers 206 and 207. Power hum, a problem which may be present in X-ray video signals, is removed by amplifying the difference between the input fluoroscopic and roadmap video signals 42 and 41 and their grounds 201 and 204 in their respective differential video input amplifiers 206 and 207. Fluoroscopic differential video input amplifier 206 has its converted fluoroscopic video output signal 210 connected to an appropriate feedback network 212 so that the output signal 210 is maintained with respect to the IVUS ground 205. Similarly, roadmap differential video input amplifier 207 is connected to an appropriate feedback network 214 so that the converted roadmap output signal 211 is also maintained with respect to the IVUS ground 205. Because the input fluoroscopic video signal 42 is of relatively high bandwidth, it may not be simply "tapped off" to provide an output fluoroscopic video signal 202 for eventual display on the fluoroscopic monitor 1. Instead, the converted fluoroscopic output video signal 210 from the fluoroscopic differential video amplifier 206 is coupled to an analogous fluoroscopic differential video buffer amplifier 219 to produce the output fluoroscopic video signal 202. Fluoroscopic differential video buffer amplifier converts the converted fluoroscopic output video signal 210 such that the output fluoroscopic video signal 202 once again is maintained with respect to the fluoroscopic ground 201 rather than the IVUS ground 205 through an appropriate feedback network 225. Suitable differential video amplifiers for units 206, 207 and 219 include the EL4430.

To process the outputs 210 and 211 from the differential video amplifiers 206 and 207, video switch box unit 50 includes an analog video switch 215, for example an active video switch from Elantec, that responds to an X-ray control signal 55 (illustrated in FIG. 2) to select a X-ray video input signal 56 from either converted fluoroscopic output video signal 210 or converted roadmap output video signal 211. The output signal 220 (roadmap or fluoroscopic) from the analog video switch 215 may then pass through a buffer and equalization stage 221 before being presented to the video isolation function subsystem 45 as the X-ray video signal 56. The equalization corrects for frequency loss induced by, for example, the coaxial cable connections in a particular catheterization lab.

The X-ray video signal 56 may now enter the video isolation function subsystem 45. Recall that the ground in hospital X-ray equipment often floats many volts off a true electric ground. For patient safety, the grounds for the IVUS monitor 30 and the X-ray monitors must be kept electrically isolated, despite the conversion of relative grounds within the video switch 50, to prevent any potential electric shock to the patient. Such isolation is difficult to perform in the analog domain. Thus, the present invention solves the isolation problem by digitizing the X-ray video signal 56 and performing the isolation along the digital path before the digitized X-ray signal is reconverted to an analog video signal for display on the IVUS monitor 30. The digitization and isolation occurs in video isolation function (VIF) subsystem 45.

Turning now to FIG. 2, a block diagram of the VIF subsystem 45 is illustrated. As just described, X-ray video signal 56 enters VIF subsystem 45 after passing through a differential video amplifier such as the EL4430 or other suitable means to provide a differential function to minimize common mode interference (hum bars) which may be prevalent in roadmap or fluoroscopic video as a result of poor ground systems and high current loads. After equalizing for losses in frequency bandwidth and gain from, for example coaxial cable losses, in buffer and equalization unit 221, and subsequent extraction of timing signals, filtering and clamping, X-ray video signal 56 enters adjustable gain unit 60. Adjustable gain unit 60 normalizes the video according to two different gain settings, depending on whether X-ray video signal 56 is roadmap video 41 or fluoroscopic video 42. In a preferred embodiment, adjustable gain unit 60 is an integrated circuit controlled by a serial DAC which in turn responds to inputs from VIF control unit 65.

Adjustable gain unit 60 outputs the normalized X-ray video signal to analog-to-digital (A/D) converter 70. Preferably A/D converter 70 is an 8 bit system capable of operation up to 132 MHz, depending on the type of input video signal. One example of a suitable A/D converter is an Analog Devices AD9054 although many other A/D converters could be used. A frame buffer (not illustrated) stores the digitized signal 71 before scan conversion occurs in scan conversion unit 75.

In a preferred embodiment, the Altera 9000 family of products such as the EPM9320 meets the requirements of scan conversion unit 75 for speed and density. Scan conversion unit 75 performs a number of functions. For example, in rate decimation unit 76, the digital X-ray signal 71 is rate decimated as necessary to 30 frames per second at a resolution of 1023(X)×960(Y) pixels. This allows, ultimately, the transfer of this digitized X-ray signal to the graphic card and frame grabber unit 20 which can then display this B/W X-ray video either full screen or in a variety of picture in picture modes on console monitor 30. Because hospital X-ray video may still occasionally be output at a Lo-Line video rate as shown in the above Table 1, an upscan unit 77 upscans the digitized Lo-Line signal, if present, to the desired 1023 (X)×960(Y) pixel resolution. Preferably, system graphics card and frame grabber 20 may display any subset of the 1023(X)×960(Y) x-ray input in a window within the SXVGA 1280(X)×1024(Y) video signal output to console monitor 30. System graphics card and frame grabber 20 may display the full X-ray image in a downsized window that is roughly 500 by 500 pixels. Thus, scan conversion unit 75 may include a 2:1 Zoom interpolation unit 78 which interpolates the original 1023(X)×960(Y) digitized X-ray video down to 512(X)×480 (Y) pixels.

The digitized X-ray video signal 80 output from conversion unit 75 must still be isolated to protect patients from the potentially unstable grounds of hospital X-ray video displays. Thus, signal 80 is isolated by isolation unit 85 which preferably provides at least 500 volts of isolation. Those of ordinary skill in the art will appreciate that isolation unit 85 may be constructed with optoisolators, digital isolation circuits or other suitable means. Isolated-digitized X-ray video signal 81 is now ready for transmission to the VCF subsystem 40. Because the VIF subsystem 45 and VCF subsystem 40 may be located on different circuit boards, a high speed digital transmission link is required between the boards. A low voltage differential signaling (LVDS) driver 90 provides the necessary high frequency data transmission capability over a transmission link consisting of, in one embodiment of the invention, a pair of cables consisting of either shielded twisted pairs or shielded ribbon connecting the VIF subsystem 45 and VCF subsystem 40 circuit boards. In a preferred embodiment, the transmission link will possess a minimum one way throughput of 100 Mbytes per second and a maximum high/low voltage swing of +/−2 volts.

At the VCF subsystem 40, an analogous LVDS driver 90 receives the digital X-ray video signal 80 over the transmission link. The digital X-ray video signal 80 is passed through to the graphics card and frame grabber unit 20 via a buffer and digital line driver unit 100 before ultimately being displayed on SXVGA console monitor 30.

The previous discussion described how an analog X-ray video signal (either roadmap or fluoroscopic) is scan converted and isolated before display on console monitor 30 according to one embodiment of the invention. The analogous process for video conversion and isolation of color analog ultrasound video for display on a black and white (B/W) X-ray monitor will now be described.

As discussed earlier, SXVGA analog video signal 25 representing an image according to the collected R, θ vectors 5 is output from the graphics card and frame grabber unit 20 to the VCF subsystem 40. Within the VCF subsystem 40, the SXVGA signal 25 is transmitted to a video amplifier 110 which amplifies the signal 25 for transmission to the console monitor 30, and the SXVGA signal 25 is also transmitted to a color to B/W Luma transcoder unit 115. The red, green, and blue analog components of the SXVGA signal 25 may be combined in unit 115 to form one analog Luma signal 116 through the use of, for example, a simple resistive adder. Analog Luma signal 116 is converted to digital form in the analog to digital (A/D) converter 120. In a preferred embodiment, A/D converter 120 is an 8 bit converter capable of pixel rates up to 133 MHz, using an A/D sample rate chosen so that the digitized output 121 will have the correct aspect ratio according to the type of X-ray video standard being employed. In addition, A/D converter will preferably transmit digitized output 121 in double byte wide format to allow faster data transfer. An example of a suitable A/D converter would be an Analog Devices AD9054. Before video conversion occurs, the digitized output signal 121 may be stored in a frame buffer 122 before performing video scan conversion in video scan converter unit 125.

Video scan conversion unit 125 according to one embodiment of the invention may be selected from the Altera 9000 family of products such as the EPM9320. Video scan conversion unit 125 may perform several functions. For example, as discussed earlier, the SXVGA signal 25 is very high-resolution video—1280(X)×1024(Y) pixels. As can be seen from the X-ray video standards in Table 1, this can represent more pixels than the X-ray video standard being converted to can support. However, as can further be seen from Table 1, essentially every Hi-Line video mode supports a resolution of 1023(X)×1023(Y) pixels. In actual practice, this ultimately translates to a matrix of 960(X)×960(Y) actually visible pixels. Thus, adjustable crop function unit 130 selects a 960(X)×960(Y) portion of the SXVGA signal 25. Software in the ultrasound processor unit shall preferably specify the upper left X, Y position of the cropping window within the SXVGA pixel space. Because some cath labs still use Lo-line RS-170 525 line video, if necessary, down scan conversion unit 140 down scans the selected 960(X)×960(Y) window of SXVGA video to 480(X)×480(Y) pixels with a rate of 60 Hz interlaced. The gray scale is adjusted according to the requirements of the particular X-ray video in use in gray scale unit 145 before the digitized B/W ultrasound video signal 150 is transmitted over the previously described transmission link by LVDS driver 90.

After traveling over the transmission link connecting the VCF subsystem 40 and VIF subsystem 45 circuit boards, the digitized B/W ultrasound video 150 is received by LVDS driver 90 within the VIF subsystem 45. Isolation unit 85 provides isolation of voltage grounds as previously described for the analogous isolation performed for the digital X-ray video signal 80. Preferably, isolation unit 85 provides an isolation of at least 500 volts to ensure patient safety. Should the digitized B/W ultrasound video be in 16 bit words, a multiplexer (not illustrated) such as an Altera 7000 family product will convert the video signal into 8 bit words for presentation to a Digital to analog (DAC) converter 160. DAC 160 converts the digitized B/W ultrasound video 150 into analog B/W ultrasound video. In one embodiment of the invention, DAC converter 160 is capable of 10 bit performance at data rates up to 135 MHz through the use of, for example, an Analog Devices AD9760. DAC converter 160 operates at rates dependent upon the X-ray video standards in use in the cath lab. Before the analog B/W ultrasound video 165 is ready for transmission to the X-ray video switch box 50, output gain amplifier 161 and equalizer 162 modify the signal as necessary to accommodate the X-ray video standards in use. Thus, the gain of output gain amplifier 161 is digitally controlled to allow matching video levels as required by a particular cath lab. Equalizer 162 compensates for loss of frequency response resulting from, for example, coaxial cable losses.

Control of system 35 is provided by, in one embodiment, a programmable system controller 135 located on the VCF subsystem 40 circuit board. System controller 135 may be implemented by an AT89C52 micro-controller or other suitable processors or microprocessors. System controller 135 communicates with a user interface (not shown) via a bus such as a PCI bus 170 through a PCI interface 175. Thus, should a user at the user interface select, for example, that a 2:1 zoom window of the roadmap video signal 41 be displayed on the console monitor 30, the appropriate commands to system controller 135 would travel over the PCI bus 170. Depending on the type of X-ray equipment in use in the cath lab, system controller 135 would then generate the appropriate command signals 180 to the various components in the VCF subsystem 40, to for example, analog to digital converter 120 and scan conversion unit 125. After initial setup, these command signal parameters could be stored in a memory device (not illustrated) such as an EEPROM. A particular cath lab with its particular X-ray video formats would be assigned a room identification number. Depending upon the particular catheterization laboratory the system 35 is interfacing with, a user would enter the appropriate identification number. In one embodiment, the identification number would be entered at the video switch box 50. The identification number would be communicated through PCI bus 170 to system controller 135 that would then select the appropriate command signals from memory. In this fashion, system 35 would be universally adaptable to any given cath lab. VIF control data from system controller 135 travels through LVDS driver 90 and the digital transmission link to the LVDS driver in the VIF subsystem 45. Within the VIF subsystem 45, VIF control unit 65 distributes the appropriate command signals 180 as selected by system controller 135 from the memory according to the selected room identification number. In addition, VIF control unit 65 transmits the X-ray video control signal 55 to X-ray video switch box 50 to activate active video switches according to the input or output of selected video signals.

In this fashion, system controller 135 can store and recall video gain settings as necessary to transfer fluoroscopic or roadmap video to the ultrasound monitor and vice-versa. In addition, system controller 135 would store and recall video scan rates, video DC offset settings, monitor vertical height settings, monitor vertical position settings, monitor horizontal width settings, gamma corrections settings as necessary in analogous fashions. The various settings would be recalled, preferably, simply by entering a room identification number at the user interface. System controller 135 would then appropriately control the components as described above.

The above-described system 35 permits the transmission and isolation of either fluoroscopic or roadmap video to an ultrasound monitor for display. However, those of ordinary skill in the art will appreciate that this system is easily modified to permit the transmission, isolation, and display of both fluoroscopic and roadmap video for simultaneous display on an ultrasound monitor in respective picture in picture type display windows. Thus, while various embodiments of the present invention have been described above, it should be understood that they have been presented by way of example only, and not limitation. The breadth and scope of the present invention should not be limited by any of the above-described exemplary embodiments, but should be defined only in accordance with the following claims and their equivalents.

I claim:

1. A system for conversion of video, comprising:
    a first analog to digital converter for digitizing a first analog video signal, said first analog video signal formatted according to a first video format, said first analog to digital converter outputting a first digitized video signal according to said first video format;
    a first video converter unit for converting said first digitized video signal into a first converted digitized video signal formatted according to a second video format;
    a graphics card and frame grabber, said graphics card receiving said first converted digitized video signal;
    a first isolator, said first isolator electrically isolating said first converted digitized video signal and said graphics card;
    a second analog to digital converter for digitizing a second analog video signal, said second analog video signal formatted according to said second video format, said second analog to digital converter outputting a second digitized video signal formatted according to said second video format
    a second video converter unit for converting said second digitized video signal to a converted second digitized video signal formatted according to said first video signal;
    a digital to analog converter for converting said converted second digitized video signal into a converted second analog video signal;
    a second isolator, said second isolator electrically isolating said second converted digitized video signal and said digital to analog converter.

2. The system of claim 1, wherein said first video format is chosen from a plurality of hospital X-ray video formats, and wherein said second video format is a high resolution standard video format, said system further comprising:
    a system controller, said system controller coupled to said first and second video converters and controlling said first and second video converters via a subset of video conversion factors, said subset of video conversion factors chosen from a plurality of subsets of video conversion factors, said system controller choosing said subset of video conversion factors appropriately for said first video format.

3. The system of claim 2 further comprising: a memory associated with said system controller, said memory storing said plurality of subsets of video conversion factors, and wherein a given subset of video conversion factors corresponds to a particular choice of said plurality of hospital X-ray video formats.

4. The system of claim 2 further comprising:
    a video switch for selecting said first analog video signal from either a fluoroscopic video signal or a roadmap video signal; said video switch outputting said first analog video signal to said first analog to digital converter, and said video switch responsive to command signals from said system controller.

5. The system of claim 4 wherein said subset of video conversion factors includes video gain settings.

6. The system of claim 4 wherein said subset of video conversion factors includes X-ray monitor horizontal width and vertical position settings.

7. The system of claim 4 wherein said subset of video conversion factors includes gamma correction settings.

8. The system of claim 4 wherein said subset of video conversion factors includes X-ray monitor DC settings.

9. The system of claim 4 wherein said subset of video conversion factors includes video scan rates.

10. A method of for conversion of video comprising the steps of:
    entering an indicia identifying a laboratory;
    digitizing a first analog X-ray video signal formatted according to a first video format to form a first digitized X-ray video signal;

selecting a first set of video conversion factors according to said indicia, said first set of video conversion factors appropriate for X-ray monitors in said laboratory;

converting said first digitized X-ray video signal to form a first converted digitized X-ray video signal formatted according to a second high-resolution video format;

electrically isolating said first converted digitized X-ray video signal from an IVUS display device;

displaying said first converted video signal on said IVUS device;

digitizing an IVUS analog video signal formatted according to said second high-resolution video format to form a second digitized IVUS video signal;

converting said second digitized IVUS video signal using said first set of video conversion factors to form a second converted digitized IVUS video signal formatted according to said first video format;

electrically isolating said second converted digitized video signal from a laboratory X-ray display; and displaying said second digitized IVUS video signal on said laboratory X-ray device.

11. A system for conversion of video, comprising:

means for digitizing a video signal, said means for digitizing coupled to a first analog video signal and a second analog video signal, said first video signal formatted according to a first video format, said second video signal formatted according to a second video format, said means for digitizing forming a first digitized video signal from said first analog video signal and a second digitized video signal from said second analog video signal;

means for converting video signals coupled to said first and second digitized video signals, said means converting said first digitized video signal using a first set of video conversion factors to form a first converted digitized video signal according to said second video format, said means converting said second digitized video signal to form a second converted digitized video signal according to said first video format, and means for controlling said means for converting video signals, said means for controlling commanding said means for converting video signals to select said first set of video conversion factors according to an identifying indicia input to said means for controlling.

12. The system of claim 11 further comprising:

means for electrically isolating said first and second converted video signals.

* * * * *